United States Patent Office 3,314,930
Patented Apr. 18, 1967

3,314,930
BUTENE-1 POLYMERIZATION CATALYST
Roger M. Nagel, Pennington, N.J., assignor to Petro-Tex Chemical Corporation, Houston, Tex., a corporation of Delaware
No Drawing. Filed Dec. 27, 1962, Ser. No. 247,496
3 Claims. (Cl. 260—93.7)

This invention relates to a process for polymerizing butene-1 and more particularly the invention relates to an improved process for polymerizing butene-1 with an aluminum reduced titanium halide, an alkyl aluminum sesquihalide and potassium iodide whereby high yields of highly isotactic poly(butene-1) may be obtained.

Butene-1 and other alpha-olefins may be polymerized to high molecular weight polymers by contacting the alpha-olefins with a catalyst, such as titanium trihalide and an organometallic compound such as an aluminum alkyl or an aluminum alkyl halide. Poly(butene-1) of relatively low isotactic content is produced when polymerizing butene-1 with a catalyst of titanium chloride where the co-catalyst consists of a trialkyl aluminum or a dialkyl aluminum chloride compound. If an alkyl aluminum sesquichloride is used, with only a titanium trichloride catalyst, the polymerization proceeds at a slow rate and low yields of solid poly(butene-1) are obtained. The alkyl aluminum sesquichloride normally contains about equal mol ratios of a dialkyl aluminum chloride and monoalkyl aluminum dichloride. The co-catalyst aluminum alkyl chlorides may be most economically produced by reacting aluminum with an alkyl chloride yielding the alkyl aluminum sesquichloride. Prior to this invention the highly active dialkyl aluminum chloride had to be separated from the slow reacting alkyl aluminum dichloride and the mixture had little commercial value as a co-catalyst for polymerizing butene-1 with titanium trichloride.

It is, therefore, an object of this invention to provide a process that will eliminate the need for this added purification step. Another object is to provide an economical process for producing high yields of highly isotactic polybutenes. Another object is to provide an improved process for producing high molecular weight, crystalline poly(butene-1) polymer by employing alkyl aluminum sesquihalides as activators or co-catalysts with titanium trichloride. Other objects of this invention will be readily apparent from the disclosure which follows.

The objects of this invention are accomplished by adding a critical amount of potassium iodide to a catalyst mixture of titanium trichloride-aluminum trichloride and alkyl aluminum sesquihalides in an amount less than 0.6 mol of the potassium iodide per mol of alkyl aluminum sesquihalide. Amounts as low as 0.05 mol of potassium iodide per mol of alkyl aluminum sesquihalide and amounts sometimes even lower may be used and improvements obtained. Preferably amounts between 0.1 and 0.5 mol of the potassium iodide per mole of sesquichloride are employed and excellent results obtained. Unexpectedly, it was found that when more than this amount is used, such as one mol, very low yields of poly(butene-1) are obtained. Use of potassium iodide is critical and other potassium halides and other alkali halides give poorer results in this catalyst system for polymerizing butene-1.

The alkyl aluminum sesquihalides having the general formula $R_3Al_2X_3$ that may be used as co-catalysts in this invention are preferably composed of mixtures of alkyl aluminum chlorides having the general formulas $R_2AlCl$ and $RAlX_2$ wherein X is a halogen and R is a saturated acyclic hydrocarbon containing from 2 to 6 carbon atoms and preferably 2 to 4 carbon atoms. Usually the molar ratio of each of the alkyl aluminum chlorides is about equal. Examples of such alkyl aluminum sesquichlorides include mixtures of diethyl aluminum chloride and ethyl aluminum dichloride; dipropyl aluminum chloride and propyl aluminum dichloride; dibutyl aluminum chloride and butyl aluminum dichloride; and mixtures thereof. Although the alkyl aluminum halide that is generally employed is the alkyl aluminum chloride, other alkyl aluminum halides such as alkyl aluminum iodides or bromides or mixtures thereof may also be employed and good results obtained.

One essential feature of this invention is the requirement that the titanium trichloride catalyst used in the polymerization of butene-1 be obtained by the reduction of titanium tetrachloride with powdered aluminum. Such a process is described in U.S. Patent 3,032,510. The titanium trichloride thus obtained is believed to have the formula $3TiCl_3 \cdot AlCl_3$ and will hereinafter be referred to as titanium trichloride-aluminum trichloride or aluminum-reduced titanium trichloride. Titanium trichloride or titanium trichloride complexes obtained by other reduction processes such as (1) reduction by hydrogen, (2) reduction by metal alkyls, (3) electrolytic reduction, or (4) thermal reduction have significantly lower catalyst activity in the process of this invention. For example, hydrogen reduced titanium trichloride, $TiCl_3$ (HRA), has produced yields of poly(butene-1) of only about 10 weight percent, while 80 weight percent yields of highly crystalline polybutene are obtained when aluminum-reduced titanium trichloride, $3TiCl_3 \cdot AlCl_3(AA)$, is employed under comparable operating conditions with ethyl aluminum sesquichloride and potassium iodide. It has also been found, although it is not essential to the operation of this invention, that ball milling of the aluminum-reduced titanium trichloride catalyst will still further improve the activity of the polymerization catalyst.

The mol ratio of the titanium trichloride-aluminum trichloride catalyst per mol of the alkyl aluminum sesquichloride co-catalyst may be varied quite widely. Generally, mol ratios of the titanium trichloride-aluminum trichloride complex, $(3TiCl_3 \cdot AlCl_3)$ between about 0.1 to one, more preferably 0.25 to 0.50 mols per mol of the alkyl aluminum sesquichloride are employed.

One of the advantages of this invention is that it is not necessary to pretreat the alkyl aluminum sesquichloride with potassium iodide before the co-catalyst alkyl aluminum sesquichloride is added to the titanium trichloride-aluminum trichloride catalyst. In fact, it has been found that the pretreatment process often is detrimental to the polymerization process. The catalyst is readily prepared merely by mixing together the titanium trichloride-aluminum trichloride, the alkyl aluminum sesquichloride and the potassium iodide, thus, avoiding any lengthy pretreatment and processing steps. This advantage lends its usefulness to either a batch or continuous polymerization process.

The butene-1 is polymerized with as little as 0.01 weight percent of catalyst to as much as ten percent or more. Usually from about 0.1 to 0.5 to five weight percent based on butene-1 is satisfactory.

The polymerization of butene-1 is generally conducted at temperatures below 250° C. and at pressures below 150 atmospheres. Preferably the temperatures are between about 25° C. to 150° C. at about 1 to 50 atmospheres. The polymerization reaction may be conducted in bulk but is generally conducted in the presence of an inert diluent, such as propane, butane, pentane, heptane, and the like. Vehicles such as isooctane, cyclohexane, benzene, toluene, and the like may also be used.

The polymer is recovered by stopping the polymerization reaction as by deactivating the catalyst with methanol, or with water; taking up the reaction mixture in hot toluene; washing the polymer solution with water or a weak acid; precipitating in excess methanol; separating the polymer by filtration; and finally drying the polymer collected.

Example 1

A catalyst mixture was prepared by adding to 300 mls. of heptane, 23.5 millimols of ethyl aluminum sesquichloride, 9.4 millimols of aluminum-reduced titanium trichloride $3TiCl_3 \cdot AlCl_3$ (AA) and 11.8 millimols of potassium iodide. No further treatment was required in charging the contents to a one liter reactor autoclave at ambient temperature and then heating the mixture to a reaction temperature of about 90° C. to 97° C. After the catalyst mixture had reached reaction temperature, approximately 330 grams of butene-1 was charged into autoclave and agitated for about 3 hours. The polymerization reaction was terminated after three hours by introducing 10 to 15 mls. of methanol into the reaction mixture. Polybutene was separated from the catalyst mixture by introducing hot toluene into the reaction mixture and washing the hot toluene solution with dilute aqueous HCl and then with water. The polymer was then precipitated from the toluene solution in methanol and dried. A polybutene yield of 273 grams or about 82.5 weight percent of polybutene was obtained. The polybutene had the following physical properties (1) percent ether insolubles—98 percent, (2) melt index—5.1 grams/10 mins., (3) density—0.913, (4) Young's modulus—27,200 p.s.i., (5) true yield point—2795 p.s.i.

Example 2

Example 1 was repeated except that the aluminum-reduced titanium trichloride, $3TiCl_3 \cdot AlCl_3$ (AA), was replaced with hydrogen-reduced titanium trichloride, $TiCl_3$ (HRA). As in Example 1, 11.8 millimols of potassium iodide was added to the titanium trichloride and the ethyl aluminum sesquichloride in heptane. A yield of only 10.5 weight percent polybutene or 35 grams was obtained. In contrast, in Example 1, 273 grams of polybutene was obtained with aluminum-reduced titanium trichloride under identical operating conditions.

Example 3

Another catalyst mixture prepared as described in Example 1 except that the quantity of potassium iodide was reduced from 11.2 millimols to 5.9 millimols, or from a mol ratio of potassium iodide to ethyl aluminum sesquichloride of 0.5:1 to 0.25:1 and butene-1 polymerized therewith as described in Example 1. 206 grams of highly crystalline polybutene was obtained. In another catalyst mixture the quantity of potassium iodide was further reduced to 3.0 millimols or a mol ratio of potassium iodide to ethyl aluminum sesquichloride of 0.13:1. Butene-1 was polymerized with the catalyst as described in Example 1 and 199 grams of highly crystalline polybutene was obtained. In another run in which the catalyst preparation described in Example 1 was repeated except that the mol ratio of potassium iodide to ethyl aluminum sesquichloride was increased to 1:1, the results indicated that no solid polymer was produced.

Example 4

Catalyst mixtures, as described in Example 1, were again prepared except that the potassium iodide added in Example 1 was replaced in one run with 11.8 millimols potassium chloride. The potassium chloride-containing catalyst produced a lower yield of poly(butene-1) than did the potassium iodide catalyst. In comparing the physical properties of the polybutene so produced with the physical properties of the polybutene obtained with a catalyst containing potassium iodide, it was found that the melt index increased and that the density and yield point of the polymer were greatly improved when potassium iodide was used as compared to potassium chloride.

| Potassium Halide | Millimols | Melt Index | Density | Yield Point, p.s.i. |
|---|---|---|---|---|
| KI | 11.8 | 5.1 | 0.913 | 2,795 |
| KCl | 11.8 | 0.95 | 0.909 | 2,280 |

Example 5

A run was made as outlined in Example 1 except that the potassium iodide was replaced with sodium chloride. The yield of polybutene obtained was substantially lower than with potassium iodide. With 11.8 millimols of NaCl, a yield of only 132 grams was obtained. In contrast, in Example 1 using potassium iodide, the yield of crystalline polymer obtained was 273 grams.

Poly(butene-1) is a useful plastic having many desirable physical properties making it particularly valuable in the form of extruded pipe, molded articles and packaging film.

I claim:
1. A process for polymerizing butene-1 which comprises contacting butene-1 with a catalyst comprising an alkyl aluminum sesquihalide wherein the alkyl groups contain 2 to 6 carbon atoms, titanium trichloride-aluminum trichloride obtained by reducing titanium tetrachloride with aluminum, and potassium iodide in a molar ratio of 0.1 to one mol of titanium trichloride-aluminum trichloride per mol of alkyl aluminum sesquihalide and 0.1 to 0.5 mol of potassium iodide per mol of alkyl aluminum sesquihalide.

2. The process of claim 1 wherein the molar ratio of titanium trichloride-aluminum trichloride to alkyl aluminum sesquihalide is 0.25 to 0.5 mol per mol of alkyl aluminum sesquihalide, and the alkyl aluminum sesquihalide is alkyl aluminum sesquichloride.

3. The process of claim 2 wherein the alkyl aluminum sesquichloride is ethyl aluminum sesquichloride.

References Cited by the Examiner
UNITED STATES PATENTS 2,909,510  9/1959  Thomas _____ 260—93.7
3,032,510  5/1962  Tornqvist et al. _____ 260—94.9

JOSEPH L. SCHOFER, Primary Examiner.

F. L. DENSON, Assistant Examiner.

UNITED STATES PATENT OFFICE
CERTIFICATE OF CORRECTION

Patent No. 3,314,930　　　　　　　　　　　　April 18, 1967

Roger M. Nagel

It is hereby certified that error appears in the above numbered patent requiring correction and that the said Letters Patent should read as corrected below.

Column 3, line 47, for "11.2 millimols" read -- 11.8 millimols --.

Signed and sealed this 28th day of November 1967.

(SEAL)
Attest:

Edward M. Fletcher, Jr.
Attesting Officer

EDWARD J. BRENNER
Commissioner of Patents